US 12,019,724 B2

(12) United States Patent
Kim et al.

(10) Patent No.: US 12,019,724 B2
(45) Date of Patent: Jun. 25, 2024

(54) DEVICE AND METHOD FOR AUTHENTICATING USER BASED ON FACIAL CHARACTERISTICS AND MASK CHARACTERISTICS OF THE USER

(71) Applicant: KOREA INSTITUTE OF SCIENCE AND TECHNOLOGY, Seoul (KR)

(72) Inventors: Ig Jae Kim, Seoul (KR); Gi Pyo Nam, Seoul (KR); Haesol Park, Seoul (KR); Junghyun Cho, Seoul (KR); Je Hyeong Hong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 197 days.

(21) Appl. No.: 17/535,575

(22) Filed: Nov. 25, 2021

(65) Prior Publication Data
US 2022/0300591 A1    Sep. 22, 2022

(30) Foreign Application Priority Data
Mar. 16, 2021  (KR) .................. 10-2021-0033695

(51) Int. Cl.
G06F 21/00   (2013.01)
G06F 21/32   (2013.01)
G06V 40/16   (2022.01)

(52) U.S. Cl.
CPC ............ G06F 21/32 (2013.01); G06V 40/168 (2022.01); G06V 40/172 (2022.01)

(58) Field of Classification Search
CPC ....... G06F 21/32; G06F 21/45; G06V 40/168; G06V 40/172; G06V 10/454; G06V 10/774; G06V 10/82; G06V 40/16; G06T 7/11; G06T 17/20
See application file for complete search history.

(56) References Cited

U.S. PATENT DOCUMENTS

| 10,984,225 | B1 * | 4/2021  | Ghosh ................. G06V 40/161 |
| 2018/0285630 | A1 * | 10/2018 | Han ..................... G06V 40/171 |
| 2020/0034603 | A1 * | 1/2020  | Yamada ................. G06T 7/246 |
| 2022/0012323 | A1 * | 1/2022  | Moriwaki ........... H04L 63/0861 |

(Continued)

FOREIGN PATENT DOCUMENTS

| CN | 111860456 A | 10/2020 |
| JP | 2010-72910 A | 4/2010 |

(Continued)

OTHER PUBLICATIONS

MaskTheFace, GeorgiaTech, 2020, <https://sites.google.com/view/masktheface>.

*Primary Examiner* — Jeffrey C Pwu
*Assistant Examiner* — William A Corum, Jr.
(74) *Attorney, Agent, or Firm* — CANTOR COLBURN LLP

(57) ABSTRACT

Embodiments relate to a user authentication device configured to detect a face region in a target object image including at least part of a face of a target object, recognize masked or unmasked in the face region, extract target object characteristics data from the face region of the target object image, call reference data and authenticate if the target object is a registered device user based on the called reference data and the target object characteristics data. The reference data is generated from an unmasked image of the registered device user.

14 Claims, 13 Drawing Sheets

(56) References Cited

U.S. PATENT DOCUMENTS

| | | | |
|---|---|---|---|
| 2022/0067432 A1* | 3/2022 | Chen | G06V 10/764 |
| 2022/0108101 A1* | 4/2022 | Bui | G06V 40/173 |
| 2022/0253628 A1* | 8/2022 | Rittman | G06T 7/60 |
| 2022/0327864 A1* | 10/2022 | Yang | G06V 40/161 |
| 2023/0004632 A1* | 1/2023 | Ueno | G06F 21/32 |
| 2023/0103555 A1* | 4/2023 | Sato | G06F 21/32 |
| | | | 382/118 |
| 2023/0135400 A1* | 5/2023 | Zhai | G06V 40/165 |
| | | | 382/118 |

FOREIGN PATENT DOCUMENTS

| | | |
|---|---|---|
| JP | 2012-160001 A | 8/2012 |
| JP | 2014-115784 A | 6/2014 |
| JP | 2020-166597 A | 10/2020 |
| KR | 10-2009-0093223 A | 9/2009 |
| KR | 10-2018-0109634 A | 10/2018 |
| KR | 10-2019-0016733 A | 2/2019 |
| KR | 10-2019-0107867 A | 9/2019 |
| KR | 10-2078249 B1 | 2/2020 |

* cited by examiner

FIG. 10D
Before setting illumination level and light direction
After setting illumination level and light direction

DEVICE AND METHOD FOR AUTHENTICATING USER BASED ON FACIAL CHARACTERISTICS AND MASK CHARACTERISTICS OF THE USER

CROSS-REFERENCE TO RELATED APPLICATION

This application claims priority to Korean Patent Application No. 10-2021-0033695, filed on Mar. 16, 2021, and all the benefits accruing therefrom under 35 U.S.C. § 119, the contents of which in its entirety are herein incorporated by reference.

TECHNICAL FIELD

Embodiments of the present disclosure relate to technology that authenticates if a target to be authenticated is a registered device user, and more particularly, to a device and method for authenticating if a target to be authenticated is a registered device user in an input image of the target wearing a mask.

NATIONAL RESEARCH AND DEVELOPMENT SUPPORT

This work was supported by the Basic Science Research Program (Grant No. NRF-2018M3E3A1057288) of the National Research Foundation (NRF) funded by the Ministry of Science and ICT, Republic of Korea.

BACKGROUND ART

In modern society, to efficiently control access to buildings and companies, an access control system using an access control card including a radio frequency identification (RFID) module is widely used. However, when a user's RFID card is lost or stolen, it causes inconvenience to the user.

Due to this problem, there is a growing trend of replacing the existing system with a biometric recognition based access control system. The biometric recognition based access control system uses a user's unique biometric information such as iris and fingerprint as an identification means, and this identification means has no risk of loss and theft.

However, in the case of iris recognition, it takes a longer time to detect an iris region than other technologies, and the presence of glasses or contact lens reduces the recognition performance.

Additionally, the fingerprint recognition requires direct contact with a terminal, which may make the user feel reluctant.

Recently, with the development of artificial intelligence (AI) technology, a facial recognition based access control system gains attention as means which can overcome the above-described limitations. For example, Patent Literature 1 (Patent Publication No. 10-2019-0107867 (2019 Sep. 23.)) determines whether a target is an authorized person by authentication through comparison between a face image acquired through an access control terminal and a face image of the target stored in a database and then allows access.

More recently, with the increasing risk of severe illness or death caused by COVID-19, wearing masks is mandatory to prevent the spread of infection, and all individuals entering buildings are required to wear masks and check their temperature. As face masks are likely to become a common part of life, it is necessary to solve the deterioration problem of the recognition performance of masked faces.

In addition, since COVID-19 virus is highly contagious, besides identification verification, potentially affected persons are not permitted to access, and the symptoms of COVID-19 include not only fever but also a variety of symptoms such as loss of smell, etc., so it is necessary to prohibit the access of potentially infectious individuals considering these symptoms.

RELATED LITERATURES

Patent Literatures (Patent Literature 1) Patent Publication No. 10-2019-0107867 (2019 Sep. 23)

DISCLOSURE

Technical Problem

According to embodiments of the present disclosure, there are provided a device and method for authenticating if a target to be authenticated is a registered device user in an input image of the target wearing a mask.

Technical Solution

A user authentication device according to an aspect of the present disclosure may detect a face region in a target object image including at least part of a face of a target object, the target object image being a masked image or an unmasked image, recognize masked or unmasked in the face region, extract target object characteristics data from the face region of the target object image, and call reference data and authenticate if the target object is a registered device user based on the called reference data and the target object characteristics data. The reference data is generated from an unmasked image of the registered device user.

In an embodiment, the called reference data is main reference data or secondary reference data, and when masked is recognized, the main reference data is called, and when unmasked is recognized, the secondary reference data is called. The main reference data and the secondary reference data are generated from the unmasked image of the registered device user.

In an embodiment, to generate the secondary reference data, the user authentication device may be further configured to generate a 3-dimensional (3D) face model of the device user from the face region of the unmasked image of the registered device user, acquire a surface shape of the device user, generate a virtual mask model having a surface shape that matches the surface shape of the device user, generate a fake masked image of the device user based on the generated virtual mask model and the 3D face model of the device user, and extract characteristics data from the fake masked image of the device user to generate the secondary reference data.

In an embodiment, to generate the main reference data, the user authentication device may be further configured to detect the face region in the unmasked image of the registered device user, and extract characteristics data from the face region of the unmasked image of the device user to generate the main reference data.

In an embodiment, the user authentication device may include at least one of a feature extractor to extract 2-dimensional (2D) characteristics from an input image or a depth extractor to extract 30 characteristics. The user authentication device 100 uses the at least one included extractor to extract the characteristics data of the reference data and the target object characteristics data.

In an embodiment, the at least one included extractor may be a trained neural network to extract the characteristics data from the input image using a training dataset including masked images alone, a training dataset including unmasked images alone, or a training dataset including masked images and unmasked images.

In an embodiment, to generate the virtual mask model, the user authentication device may be configured to call a pre-stored mask shape template, and modify a surface shape of the called mask shape template to match the surface shape of the device user.

In an embodiment, the mask shape template may be generated based on pre-stored mask characteristics. The user authentication device is configured to call the mask shape template based on the mask characteristics that matches mask characteristics included in the target object characteristics data extracted from the target object image, when the masked image is inputted as the target object image.

In an embodiment, to generate the fake masked image, the user authentication device may render the virtual mask model to 2D and project onto the unmasked image of the device user.

In an embodiment, the user authentication device may generate the fake masked image after masked in the target object image is recognized, and a location of projection in the unmasked image of the device user may be a location that matches a mask region in the target object image.

In an embodiment, the user authentication device may generate the mask shape template in response to a user input including the mask characteristics. The mask characteristics for generating the mask shape template include at least one of a mask type, a mask texture, a mask color or a mask shape.

In an embodiment, in case that there is the mask shape template generated by the user input at the time of user authentication, the user authentication device may be configured to perform the user authentication only when mask characteristics worn by the target object and the mask characteristics of the mask shape template generated by the user input match.

In an embodiment, the user authentication device may be configured to record a user recognition result including a previous recognition result and the recognized mask characteristics, and in case that there is a latest mask shape template recorded at the time of user authentication, perform the user authentication only when mask characteristics worn by the target object and mask characteristics of the latest mask shape template match.

In an embodiment, the user authentication device gives an authority to use the device to the device user having succeeded the user authentication, and differently sets a range of the authority given when the user authentication succeeded after unmasked in the target object image is recognized and a range of the authority given when the user authentication succeeded after masked in the target object image is recognized.

In an embodiment, the user authentication device may be further configured to adjust a mask of the fake masked image to match the mask characteristics of the extracted characteristics data when the unmasked image of the target object is inputted as the target object image.

In an embodiment, the user authentication device may adjust at least one of a size of the mask, a texture of the mask, a brightness of the mask, an illumination level of the mask, a light direction of the mask or a resolution of the mask to match the mask characteristics of the extracted characteristics data.

Advantageous Effects

According to an aspect of the present disclosure, it is possible to perform a user authentication operation with high accuracy when an unmasked image or a masked image is inputted to a user authentication device in which a device user is registered based on only an unmasked image.

The effects of the present disclosure are not limited to the above-mentioned effects, and other effects not mentioned herein will be clearly understood b those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and are not intended to be limiting of the present disclosure. Additionally, for clarity of description, some elements in the accompanying drawings may be depicted in variously changed forms such as exaggeration and omission.

FIG. 10D shows adjustment of mask illumination level and/or light direction among mask characteristics.

BEST MODE

The terminology used herein is for the purpose of describing particular embodiments and is not intended to be limiting of the present disclosure. Unless expressly stated to the contrary, the singular forms as used herein include the plural forms as well. The term "comprises" when used in this specification, specifies the presence of stated features, regions, integers, steps, operations, elements and/or components, but does not preclude the presence or addition of one or more other features, regions, integers, steps, operations, elements and/or components.

Unless otherwise defined, all terms including technical and scientific terms used herein have the same meaning as commonly understood by those skilled in the art. It will be further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 1:
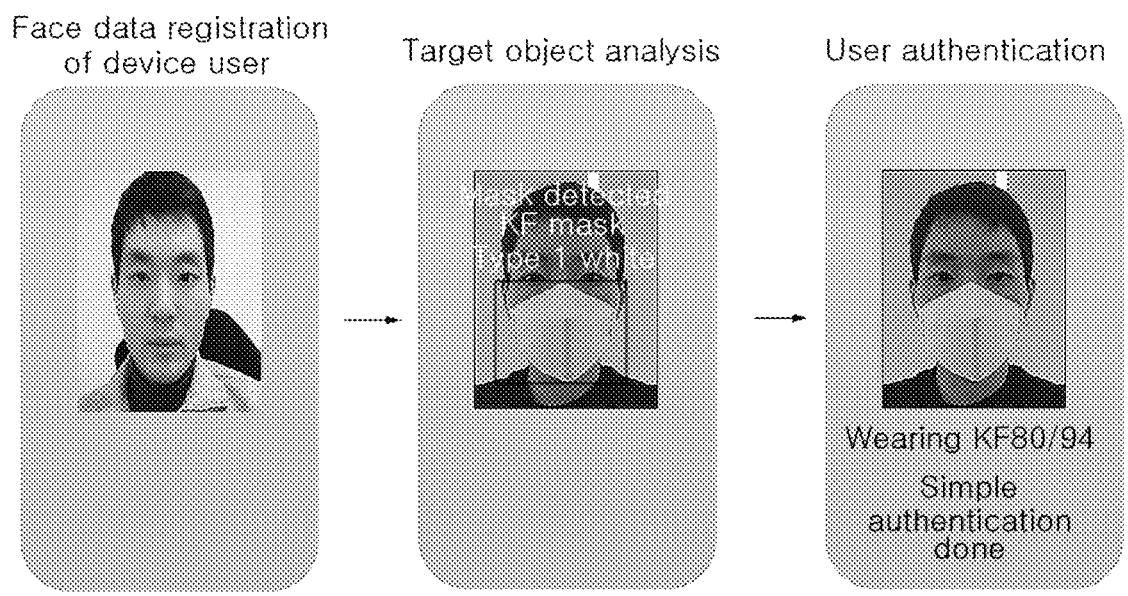
FIG. 1 is a schematic diagram of the operation of a user authentication device according to an aspect of the present disclosure.

FIG. 1 is a schematic diagram of the operation of a user authentication device according to an aspect of the present disclosure.

Referring to FIG. 1, the user authentication device 100 according to an aspect of the present disclosure is configured to perform a user authentication operation based on object recognition in images. Here, a target object to be recognized for authentication is an object of which an image is captured in which a face region is partially covered like wearing a mask, and the partially covered region has a common view to most of people. The user authentication device 100 authenticates if the target object is a user who is authorized to use the device or all or some of a plurality of application installed in the device, by comparing the image of the target object having the partially covered face region such as a masked image with registered face data.

The user authentication device 100 generates reference data used for user authentication from a fully exposed image having no partially covered region in the face, and stores it.

In an embodiment, the reference data used for user authentication may be main reference data or secondary reference data. When the user authentication operation starts, the main reference data is reference data used when an image (hereinafter, a "target object image") including at least part of the face of the target object is an unmasked image. The secondary reference data is reference data used when the target object image is a masked image. The user authentication device 100 having registered the device user through the unmasked image may authenticate the device user using the reference data, no matter whether the masked image or the unmasked image is acquired as the target object image.

Figure 2:
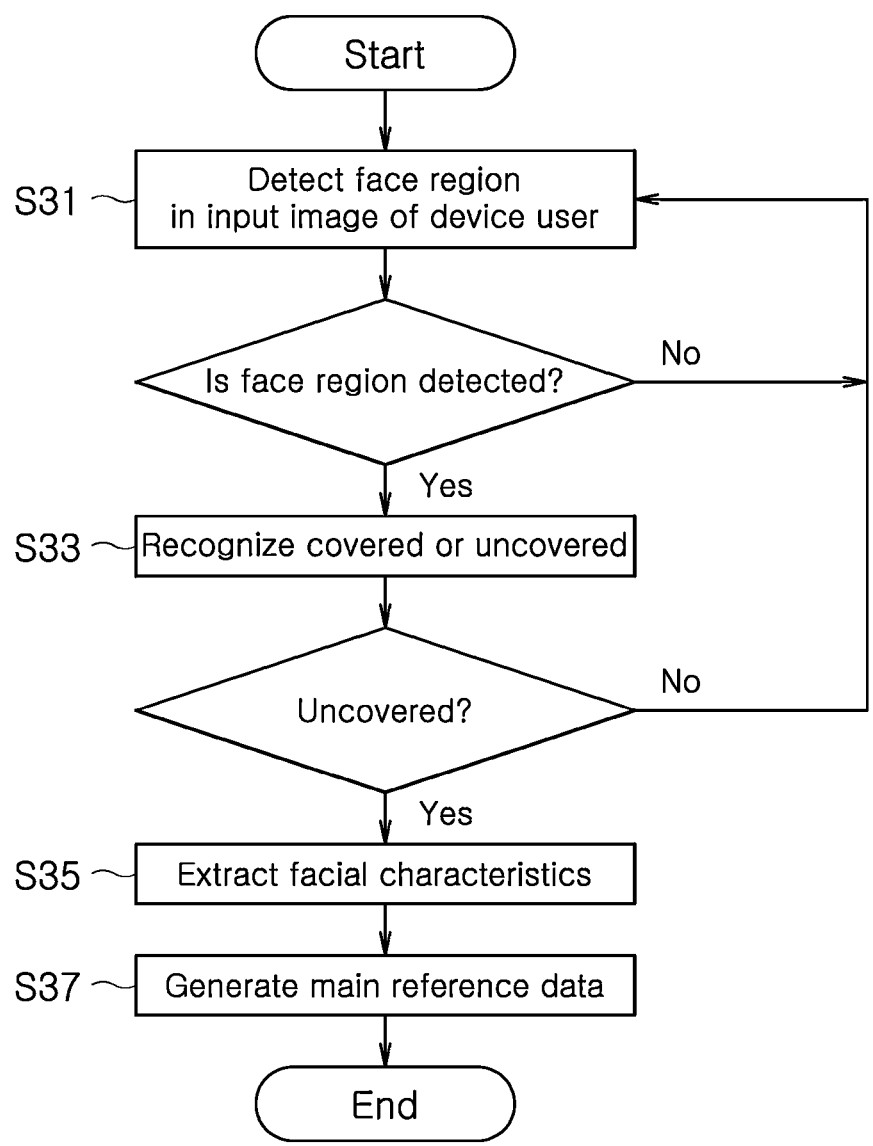
FIG. 2 is a flowchart of a process of generating main reference data according to an embodiment of the present disclosure.
Figure 3:
FIG. 3 shows a registered face image of FIG. 2.

FIG. 2 is a flowchart of a process of generating the main reference data according to an embodiment of the present disclosure, and FIG. 3 shows the registered face image of FIG. 2.

Referring to FIG. 2, when the unmasked image of the target object is inputted as the target object image, the user authentication device 100 may generate the main reference data to be used for user authentication.

The user authentication device 100 acquires a face image of the device user using initial input data and detects a face region (S31). The face image of the device user for generating the main reference data is unmasked image data as shown in FIG. 3. When the device user is registered by the unmasked image of FIG. 3, the face image of the device user in the step S31 such as the unmasked image of FIG. 3 is treated as a registered face image. The main reference data is generated directly based on a fully exposed image that is not partially covered with a mask.

The user authentication device 100 may detect the face region from the unmasked image of the device user through a pre-stored face detection algorithm (S31). The face detection algorithm is configured to detect a region including the face in the input image as the face region.

The face detection algorithm may be a region detector based on a neural network, such as, for example, Convolution Neural Network (CNN). However, the face detection algorithm may include algorithms of various specific region detection methods including at least one method of Haar, Scale Invariant Feature Transform (SIFT), Histogram of Gradients (HOG), Support Vector Machine (SVM) or Gabor, but is not limited thereto.

The user authentication device 100 recognizes whether the detected face region is covered or uncovered before extracting facial characteristics from the face region (S33). In particular embodiments, masked in the face region may be recognized as covered. The recognition of masked may be performed through the pre-stored mask detection algorithm. The mask detection algorithm may recognize masked or unmasked by extracting features related to masked in the face region.

The features include features describing the face region in the input image and/or features describing the mask region in the input image. The features describing the face region may be a facial representation depicting a face picture in the face region of the input image. The features describing the mask region may be a mask representation depicting a mask picture in the face region of the input image.

The mask detection algorithm includes, for example, algorithms that perform at least one method of Convolutional Neural Network (CNN), Histogram of Gradient (HOG), Local Binary Patterns (LBP), Principal Components Analysis (PCA), Linear Discriminant Analysis (LDA), Support Vector Machin (SVM) or Support Vector Regression (SVR), but is not limited thereto.

In an embodiment, the mask detection algorithm may be trained using a first training sample including masked training images and first labeled data indicating masked, or a second training sample including unmasked training images and second labeled data indicating unmasked. The calculation of masked scores may rely on the training sample used to train the parameters of the algorithm. For example, when a set of first training samples is used, the parameters may be trained to give high scores to a masked image. Alternatively, when a set of second training samples is used, the parameters may be trained to give high scores to an unmasked image.

In certain embodiments, the recognition of masked or unmasked may be performed using the masked scores calculated based on the extracted features. The masked scores may be an output value outputted through the mask detection algorithm or its scaled value.

For example, when the mask detection algorithm is configured to extract the features from the face of the input image and calculate a probability of wearing a mask as the output value, the probability value or the scaled value converted into a preset score range may be used as the masked score. The user authentication device 100 determines whether the target object wears a mask by comparing a preset mask threshold with the calculated masked score. For example, when the masked score is equal to or higher than the mask threshold, the user authentication device 100 determines that the corresponding object wears a mask.

When the masked score is less than the mask threshold, the user authentication device 100 recognizes that the corresponding object does not wear a mask.

When unmasked in the face region is recognized, the user authentication device 100 extracts characteristics data from the face region of the unmasked image of the device user to generate the main reference data (S35).

The characteristics data is data of facial characteristics that can be extracted from the user's face image. In particular embodiments, the characteristics data may include features extracted from the input image. The features are a facial representation for verifying the identity of a person in the face displayed in the input image, and are extracted from the input image as a feature value or a feature vector.

In an embodiment, the characteristics data may include 2-dimensional (2D) image characteristics and/or 3-dimensional (3D) image characteristics.

The 2D image characteristics are characteristics that can be extracted from image data (for example, 2D face patch data) of the 2D face region. The user authentication device 100 directly extracts 2D characteristics from a patch of the detected face region recognized as unmasked in the steps S31 and S33.

The 2D characteristics include at least one landmark and/or feature data located on the face surface.

The landmarks are key facial features, and are spots used to describe the shape of the major organs of the face such as the corners of the eyes, the corners of the nose, the corners of the mouth, and the corners of the eyebrows. The user authentication device 100 may acquire approximately 68 landmarks from the detected face image of FIG. 3.

The 2D characteristics may be acquired by a feature descriptor which extracts features in a 2D image (for example, pixels). The feature descriptor may be implemented as a feature extractor. For example, the feature extractor includes an algorithm that performs at least one method of Principal Components Analysis (RCA), Local Discriminant Analysis (LDA), Local Binary Pattern (LBP), Scale Invariant Feature Transform (SIFT), Learning-based Encoding (LE), Histogram of Oriented Gradient (HOG). Independent Components Analysis (ICA), Convolution Neural Network (CNN) or long short term memory (LSTM), but is not limited thereto. The features extracted through the feature extractor may include global features and/or local features of the face in the input image.

The 3D image characteristics are characteristics that can be extracted from a 3D model of the object in the image. The user authentication device 100 generates a 3D face model of the user based on the 2D face region patch in the steps S31 and S33, and extracts 3D characteristics from the generated 3D face model of the device user.

The user authentication device 100 generates the 3D face model of the user based on the 2D face region patch in the step S33 by a variety of 3D modeling methods.

The 3D characteristics may include variables of a low-rank model of the 3D face model, shape of the 3D face, texture of the 3D face and/or depth of the 3D face.

The variables of the low-rank model may include identity values and expression values.

The depth of the 3D face may be acquired in the form of a depth map. The depth map of the 3D face may be extracted by a depth extractor. The depth extractor may be, for example, a neural network model trained to extract the depth map in a plurality of input images that constitutes the 3D model.

Additionally, when the user authentication device 100 includes a depth sensor, depth data of the 3D face may be based on values that are sensed by the depth sensor.

In alternative embodiments, the 3D face model of the device user may be generated as a 3D mesh model. Then, the 3D characteristics may further include variables of the 3D mesh model. The variables of the 3D mesh model may include, for example, mesh data, mesh structure and mesh point data.

The user authentication device 100 generates and stores the unmasked image and/or all or part of the extracted characteristics data as the main reference data (S37). The unmasked image of FIG. 3 itself may be included in the main reference data.

When the main reference data is generated and stored, the person in the input image is registered as the device user. The registered device user is authorized to use the function of the device.

When the unmasked image is inputted as the target object image, the user authentication device 100 extracts target object characteristics data from the target object image, and performs the user authentication operation based on the target object characteristics data and the pre-stored main reference data. The user authentication process is incorporated into a user authentication method as described below with reference to FIG. 5.

Figure 4:
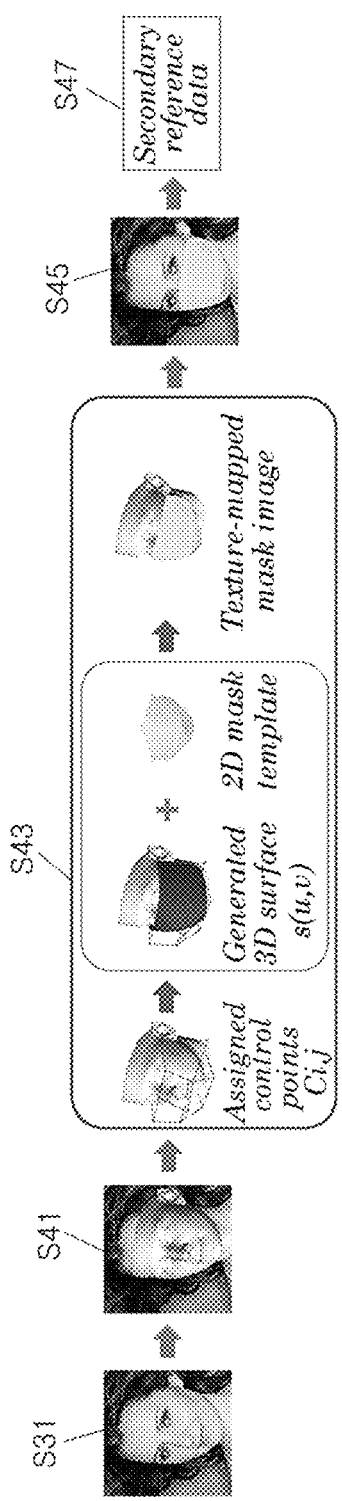
FIG. 4 is a schematic diagram of a process of generating secondary reference data of a device user according to an embodiment of the present disclosure.

FIG. 4 is a schematic diagram of a process of generating the secondary reference data of the device user according to an embodiment of the present disclosure.

Referring to FIG. 4, when the masked image is inputted as the target object image, the user authentication device 100 may generate the secondary reference data to be used for user authentication. The process of generating the secondary reference data of FIG. 4 is similar to the process of generating the main reference data of FIG. 2, and the process of FIG. 4 will be described based on difference(s).

The user authentication device 100 generates the 3D face model of the device user from the face region of the unmasked image used to generate the reference data of FIG. 2, and acquires the surface shape of the device user (S41).

The user authentication device 100 may generate the 3D face model of the registered device user from the patch of the face region detected in the step S33. The user authentication device 100 may generate the 3D face model of the device user by a 3D modeling method (S41).

The surface shape of the device user may be acquired by applying a 3D Morphable Model fitting (3DMM fitting) method to the 3D face model of the device user. Then, the surface shape of the 3D face model is acquired as the surface shape of the device user. However, the acquisition of the surface shape is not limited to this method.

When the 3D face model of the device user used to acquire some (for example, 3D characteristics) of the characteristics data for the main reference data is stored in the user authentication device 100, the user authentication device 100 may directly use the stored 3D face model of the device user to acquire the secondary reference data. For example, the 3D face model of the device user generated in the step S35 of FIG. 2 may be directly used to generate the secondary reference data. Then, the user authentication device 100 may acquire the surface shape of the 3D face model of the device user for the secondary reference data from the 3D face model for the main reference data.

The user authentication device 100 may generate the virtual mask model (S43). The virtual mask model has the surface shape that matches the surface shape of the 3D face model of the device user in the step S41.

In an embodiment, the user authentication device 100 may generate the virtual mask model for the device user by calling a pre-stored mask shape template. The mask shape template is a shape template generated based on pre-stored mask characteristics. The user authentication device 100 stores the mask characteristics through the mask shape template.

In an embodiment, the mask characteristics may include a mask type, a mask texture, a mask color and/or a mask shape. The mask texture includes a surface wrinkle and a material of the mask. The mask type may include a commercially available type, for example, a KF 80 mask, a KF 94 mask and a surgical mask.

As described above, the user authentication device 100 generates the virtual mask model based on the mask texture, the mask color and the mask shape.

The user authentication device 100 modifies the surface shape of the called mask shape template to match the surface shape of the 3D face model acquired in the step S41 (S43).

In an embodiment, the user authentication device 100 assigns the landmarks co to the 3D face surface or its neighborhoods to generate a 3D surface of a virtual mask, and modifies the surface shape of the called mask shape template to match the generated 3D surface of the virtual mask. The virtual mask model based on the mask shape template is parameterized to at least one landmark. The user authentication device 100 may adjust the parameter values of the parameterized virtual mask model to match the surface shape of the 3D face model of the device user, to generate an identical or similar image to the face image of the device user wearing a mask from the unmasked image used in the user registration.

In another embodiment, the pre-stored mask shape template may be a cylinder shape model. The mask shape template has a part of the cylindrical structure as the model shape. The user authentication device 100 may generate the 3D surface of the virtual mask by modifying the size of the called cylinder shape model to match the size of the surface shape of the 3D face (S43).

In still another embodiment, the user authentication device 100 may generate a 3D virtual surface model for the mask actually worn by the target object. The user authentication device 100 detects the mask region of the target object image, and generates a 3D shape model for the actually worn mask by 3D modeling of the patch of the 2D mask region. The process of generating the 3D mask shape model from the 2D mask patch is similar to the step S35 of generating the 3D face model from the 2D face image, and its detailed description is omitted herein.

In certain embodiments, the user authentication device 100 may extract the mask characteristics from the mask region of the target object image. Then, the user authentication device 100 may generate the 3D shape model of the actually worn mask further based on the mask characteristics.

The user authentication device 100 generates a fake masked image based on the virtual mask model generated in the step S43 and the 3D face model of the device user in the step S41 (S45).

In an embodiment, the user authentication device 100 generates the fake masked image by rendering the virtual mask model to 2D and projecting onto the unmasked image (the image of FIG. 3) of the registered device user.

In particular embodiments, a region in which the rendered virtual mask patch is projected onto the unmasked image of the registered device user matches the mask region in the target object image. To this end, the fake masked image may be generated after the target object image is inputted.

A location in the registered face image that matches the location of the mask region in the face region of the target object displayed in the target object image is calculated. The projection region of the registered face image (the unmasked image of FIG. 3) may be determined based on the matched location.

For example, the location of the mask region in the registered face image may be determined to match the mask region in the target object image based on the location of each pixel of the face region in the target object image, the location of each pixel of the mask region that partially covers the face in the target object image and the location of each pixel of the face region in the registered face image.

In another embodiment, a 3D masked face model may be generated by combining the virtual mask model with the 3D face model on a 3D space, and a masked image may be acquired by rendering the 3D masked face model. The view in rendering matches the view of the target object image.

In alternative embodiments, the user authentication device 100 may warp the texture of the virtual mask model to represent the texture. The texture warped virtual mask model may be rendered and projected, or combined and rendered (S45).

Additionally, the user authentication device 100 may add a contrast effect by partially darkening or whitening the mask based on the surface shape of the 3D face model. Accordingly, the user authentication device 100 realizes the wrinkled texture of the worn mask.

In certain embodiments, to warp the texture, the user authentication device 100 may perform a padding process on the virtual mask model. The padding process may be, for example, a zero-padding process.

The user authentication device 100 may extract additional characteristics data from the fake masked image of the registered device user (S45). The additional characteristics data extracted in the step S45 is image characteristics in the face region extracted from the fake masked image. As opposed to the characteristics data in the step S35, the additional characteristics data extracted in the step S45 may not include some landmarks (for example, the corners of the mouth) covered with the mask.

Meanwhile, the characteristics data extracted in the step S45 includes mask characteristics extracted from the mask region. That is, the mask characteristics may be extracted as 2D characteristics and 3D characteristics, and the texture and shape of the mask surface may be acquired as 2D characteristics and 3D characteristics. Accordingly, the 2D characteristics and 3D characteristics acquired in the step S45 include image characteristics of the exposed face region and image characteristics of the mask region. The image characteristics of the mask region, i.e., the mask characteristics may include the mask type, the mask texture, the mask color, and/or the mask shape represented in the fake masked image.

The extraction of the facial characteristics from the fake masked image of the device user in the step S45 is similar to the extraction of the facial characteristics from the unmasked image of the device user in the step S35, and its detailed description is omitted herein.

The user authentication device 100 generates the secondary reference data based on the fake masked image of the registered device user and/or the additional characteristics data (S47).

The secondary reference data may include additional facial characteristics data of the device user and/or fake masked image data of the device user.

When the masked image is inputted as the target object image, the user authentication device 100 extracts the target object characteristics data from the target object image, and performs the user authentication operation based on the target object characteristics data and the pre-stored secondary reference data. The user authentication process is incorporated into a user authentication method as described below with reference to FIG. 5.

Figure 5:
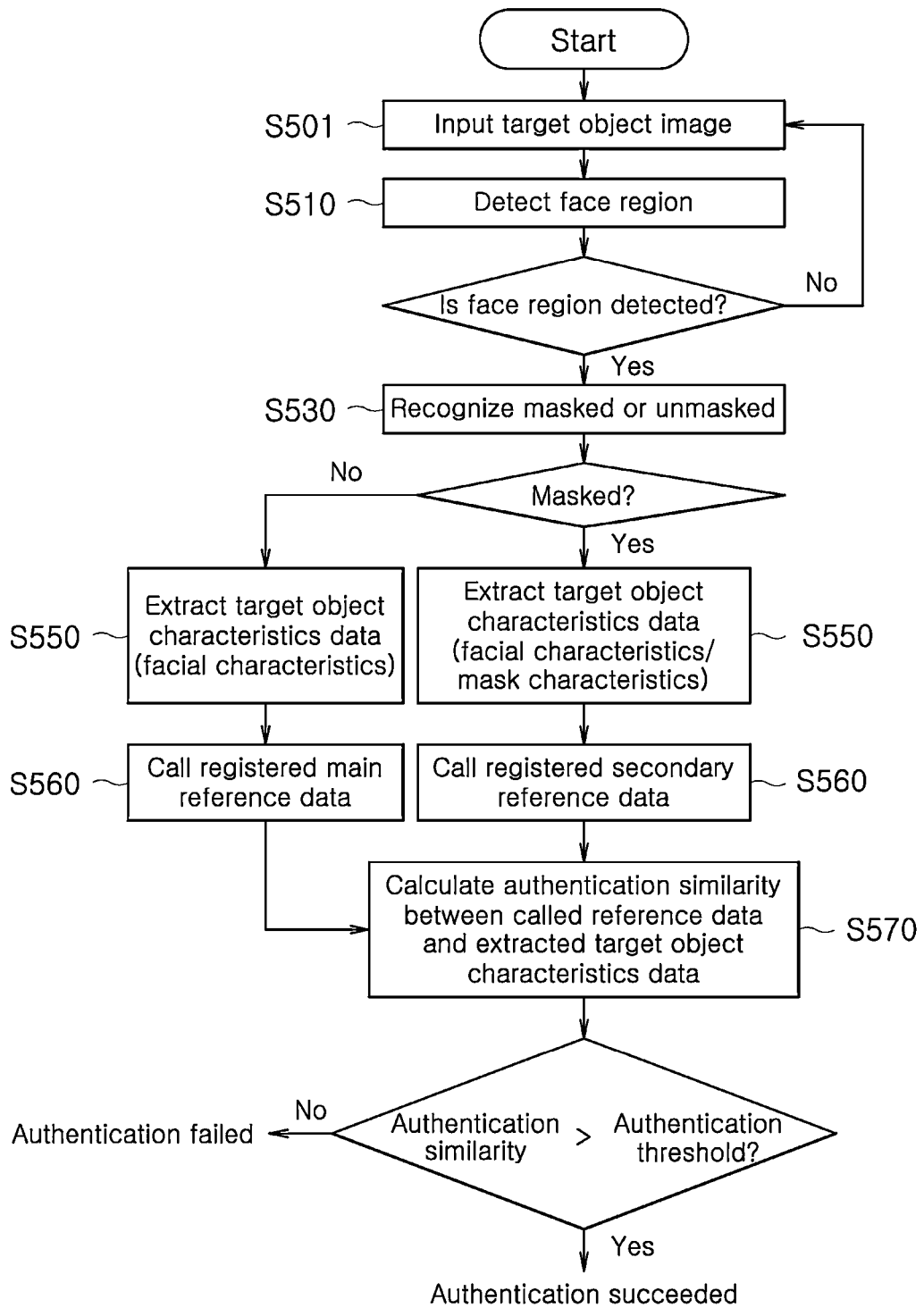
FIG. 5 is a flowchart of a user authentication method according to another aspect of the present disclosure.

FIG. 5 is a flowchart of a user authentication method according to another aspect of the present disclosure.

Some steps of FIG. 5 are similar to the steps of FIGS. 2 and 4, and the steps of FIG. 5 will be described based on difference(s).

Referring to FIG. 5, the user authentication method includes acquiring, by the user authentication device 100, a target object image (S501). The target object image may be a masked image or an unmasked image.

The user authentication device 100 pre-stores main reference data based on an unmasked image.

The user authentication method includes detecting, by the user authentication device 100, a face region of the target object image (S510), and recognizing whether the target object wears a mask in the detected face region (S530). The operation of the steps S510 and S530 is the same as the steps S31 and 333 described above with reference to FIG. 2 in the principle of detecting a region and detecting whether the region is masked or unmasked, only different in that an image in which the face region is detected and an image in which masked or unmasked is recognized are the target object image of the step S501. The operation of the steps S510 and S530 is similar to the operation of the steps 331 and 333, and its detailed description is omitted herein.

The user authentication method includes extracting target object characteristics data from the target object image (S550).

When the target object image is an unmasked image, the extracted facial characteristics of the target object correspond to the facial characteristics extracted in the step S35, and when the target object image is a masked image, the extracted facial characteristics of the target object correspond to the additional facial characteristics extracted in the step S545. If the target object is a true device user, the facial characteristics of the target object may be identical or almost identical to the previously extracted facial characteristics of the device user.

When the target object image is an unmasked image, 2D characteristics and 3D characteristics extracted from the target object image include 2D characteristics and 3D characteristics of skin. When the target object image is a masked image, 2D characteristics and 3D characteristics extracted from the target object image include 2D characteristics and 3D characteristics of skin and 2D characteristics and 3D characteristics of the mask.

The process of the step S550 is similar to the process of the steps S35 and 345; and its detailed description is omitted herein.

The user authentication method includes calling reference data (S560), and authenticating if the target object is the registered device user based on the called reference data and the target object characteristics data (S570).

In an embodiment; the type of the reference data called in the user authentication method may rely on the recognition of masked or unmasked in the step S530. When unmasked in the target object image is recognized, main reference data is called (S560). When masked in the target object image is recognized, secondary reference data may be called (S560).

In an embodiment, the step S560 may include generating the secondary reference data for the device user when the secondary reference data to call is not yet generated after masked in the target object image is recognized.

In an embodiment, the user authentication device 100 may generate a virtual mask model based on mask characteristics of the target object image recognized in the step S550 (S560). The user authentication device 100 may search for a mask shape template that matches the mask characteristics of the mask displayed in the target object image among a plurality of pre-stored mask shape templates, and generate the virtual mask model based on the found mask shape template and use it for user authentication (S560). The process of generating the secondary reference data (S560) is described above with reference to FIG. 4, and its detailed description is omitted herein.

The step S570 includes calculating an authentication similarity based on the reference data (the main reference data and the secondary reference data) called for user authentication and the target object characteristics data. The user authentication is performed based on the authentication similarity.

The authentication similarity refers to the degree of matching between facial characteristics in the reference data and facial characteristics of the target object image. When the authentication similarity is higher than a preset authentication threshold, the user authentication succeeds. When the authentication similarity is less than the preset authentication threshold, the user authentication fails.

The authentication threshold is set based on the race of the device user and the mask characteristics. The mask characteristics may include a mask texture, a mask color and a mask shape.

In an embodiment, the authentication threshold may be set based on the mask characteristics of the mask usually worn by the device user.

When masked is recognized in the step S530, the secondary reference data is used for user authentication. It is because when masked is recognized in the step S530, the target object image is a masked image. When unmasked is recognized in the step S530, the reference data is used for user authentication. It is because when unmasked is recognized in the step S530, the target object image is an unmasked image.

In an embodiment, the authentication similarity may be a 2D similarity based on 2D characteristics of the called reference data and 2D characteristics of the target object characteristics data, a 3D similarity based on 3D characteristics of the called reference data and 3D characteristics of the target object characteristics data, and a combination thereof.

The 2D similarity is calculated based on the 2D characteristics of the called reference data and the 2D characteristics of the target object characteristics data.

In an example, the 2D characteristics of the called reference data and the 2D characteristics of the target object characteristics data may be global features of the target object image through a CNN/LSTM based neural network, such as, for example, VGGFace2, The 2D characteristics extracted via the CNN/LSTM based neural network may be extracted in the form of a vector.

The user authentication device 100 may be configured to use a variety of similarity comparison algorithms for calculating a similarity between feature vectors as the 2D similarity. The similarity comparison algorithm may include, for example Euclidean Distance, Cosine Distance, Mahalanobis Distance, L1 distance and L2 distance, but is not limited thereto.

The 3D similarity is calculated based on the 3D characteristics of the called reference data and the 3D characteristics of the target object characteristics data.

In an embodiment, the user authentication device 100 may calculate the 3D similarity between a depth map of a 3D fake masked model of the secondary reference data and a depth map of a 3D masked model of the target object who actually wears a mask.

Additionally, the user authentication device 100 may calculate a similarity for each region between the target object and the device user for each of the face region and at least one sub-region of the face region, and calculate a 2D similarity and/or a 3D similarity between the target object and the device user by combining the similarities for each region (S570).

The 2D similarity between the target object and the device user is calculated by combining the 2D similarities for each region. The 3D similarity between the target object and the device user is calculated by combining the 3D similarities for each region. First, the 2D similarity between the target object and the device user calculated by combining the 2D similarities for each region will be described with reference to FIG. 5.

Figure 6:
FIG. 6 shows a face sub-region for 2D similarity calculation according to an embodiment of the present disclosure.

FIG. 6 shows the sub-region of the face for 2D similarity calculation according to an embodiment of the present disclosure.

Referring to FIG. 6, the sub-region of the face region includes at least one landmark. Among each sub-region, a certain sub-region may be, in whole or in part, included in other sub-region.

As shown in FIG. 6, the sub-region may be set as landmarks S1 of an eye (for example, the left eye) of a specific side and the remaining region S2 above the mask region in the face region. The user authentication device 100 calculates a face region similarity based on the 2D characteristics of the entire face region in the secondary reference data and the 2D characteristics of the entire face region in the target object image, calculates a sub-region S1 similarity based on the 2D characteristics of the sub-region S1 in the secondary reference data and the 2D characteristics of the sub-region S1 in the target object image, and calculates a sub-region S2 similarity based on the 2D characteristics of the sub-region S2 in the secondary reference data and the 2D characteristics of the entire sub-region S2 in the target object image. Then, the user authentication device 100 calculates the authentication similarity between the target object and the device user by combining the similarities for each region.

In an embodiment, the user authentication device 100 may assign a weight for each region, and calculate the authentication similarity through the sum of weights.

However, the method of combining the similarities for each region by the user authentication device 100 is not limited thereto, and the user authentication device 100 may use, for example, SUM, MIN, MAX, PRODUCT and SVM.

The user authentication device 100 may calculate the 3D similarity between the target object and the device user in the similar way to the above-described 2D similarity. Here, the sub-region for calculating the 3D similarity between the target object and the device user is a sub-region of the 3D face model. For example, the sub-regions S1 and S2 of FIG. 6 may be set for the 3D fake masked model of the device user and the 3D masked model of the target object.

As described above, when the user authentication device 100 acquires only an unmasked image for user registration, the user authentication device 100 may authenticate the user both for the target object with a mask and the same target object without a mask. When the target object image is an unmasked image, the user authentication device 100 authenticates the user through the degree of matching between unmasked images by calling the reference data based on the unmasked image, or when the target object image is a masked image, the user authentication device 100 authenticates the user through the degree of matching between masked images by calling the secondary reference data based on a fake masked image generated from an unmasked image.

In an embodiment, the feature extractor may be used to extract the characteristics data of the reference data and the target object characteristics data. The 2D characteristics of the target object image may be re-extracted by the feature extractor for extracting the 2D characteristics of the called reference data.

Additionally, the depth extractor may be used to extract the characteristics data of the reference data and the target object characteristics data. The 3D characteristics of the target object image may be re-extracted by the depth extractor for extracting the 3D characteristics of the called reference data.

The user authentication device 100 has high accuracy of user authentication even when the same feature extractor or depth extractor is applied to both the registered face image and the target object image irrespective of whether the registered face image and the target object image are unmasked images or masked images.

To clearly describe the high accuracy irrespective of whether the registered face image and the target object image are unmasked images or masked images, the operation of the user authentication device 100 will be described based on the feature extractor.

The neural network for extracting facial characteristics such as a CNN based neural network is configured to acquire features based on a specific region in the face, for example, eyes, a nose and a mouth, by gradually carrying out convolution and pooling on the specific region.

When a masked image is inputted to the feature extractor, the mask texture of the mask region is extracted as the features, and thus the characteristics data compared for similarity calculation should be characteristics data extracted from a pair of images of the same type (i.e., a pair of masked images or a pair of unmasked images).

Specifically, when an unmasked image is inputted to the above-described neural network as the registered face image, features such as the skin texture of a region not covered with a mask are extracted to generate the reference data. On the other hand, when a masked image is inputted to the above-described neural network as the registered face image, the mask texture of the mask region is extracted as the 2D characteristics of the target object to be compared with the reference data. Even though the registered face image and the target object image are images for the same person, 2D characteristics in a specific region (i.e., a region with/without mask) are different depending on whether the person wears a mask or not, resulting in failed user authentication for the same person.

In contrast, the user authentication device 100 may extract 2D characteristics of the unmasked image to generate the reference data through one feature extractor, or extract 2D characteristics of the fake masked image to generate the secondary reference data, or extract 2D characteristics of the target object image to acquire the target object characteristics data. To this end, the user authentication device 100 always has high accuracy by calculating the authentication similarity based on the characteristics data extracted from a pair of images of the same type even though one feature extractor is used. That is, by generating the fake masked image, the user authentication device 100 has high accuracy using only one feature extractor in case that the registered face image and the target object image are of the same type or even in case that they are of different types.

Additionally, the user authentication device 100 may use the trained extractor(s) using a training dataset including masked images alone, a training dataset including unmasked images alone, or a training dataset including masked images and unmasked images, i.e., the feature extractor and/or the depth extractor. The accuracy of the user authentication operation of the user authentication device 100 performed by generating the fake masked image is relatively free from the reliance on the image type of the training dataset of the feature extractor that extracts the characteristics.

In addition, the user authentication device 100 may be further configured to generate the mask shape template based on the users input. In an embodiment, in response to the input of the mask characteristics of a mask (hereinafter, a "favorite mask") usually used by the registered device user, the user authentication device 100 may generate the mask shape template corresponding to the favorite mask. When the masked image is inputted as the target object image, the mask shape template corresponding to the favorite mask may be preferentially used.

Figure 7:
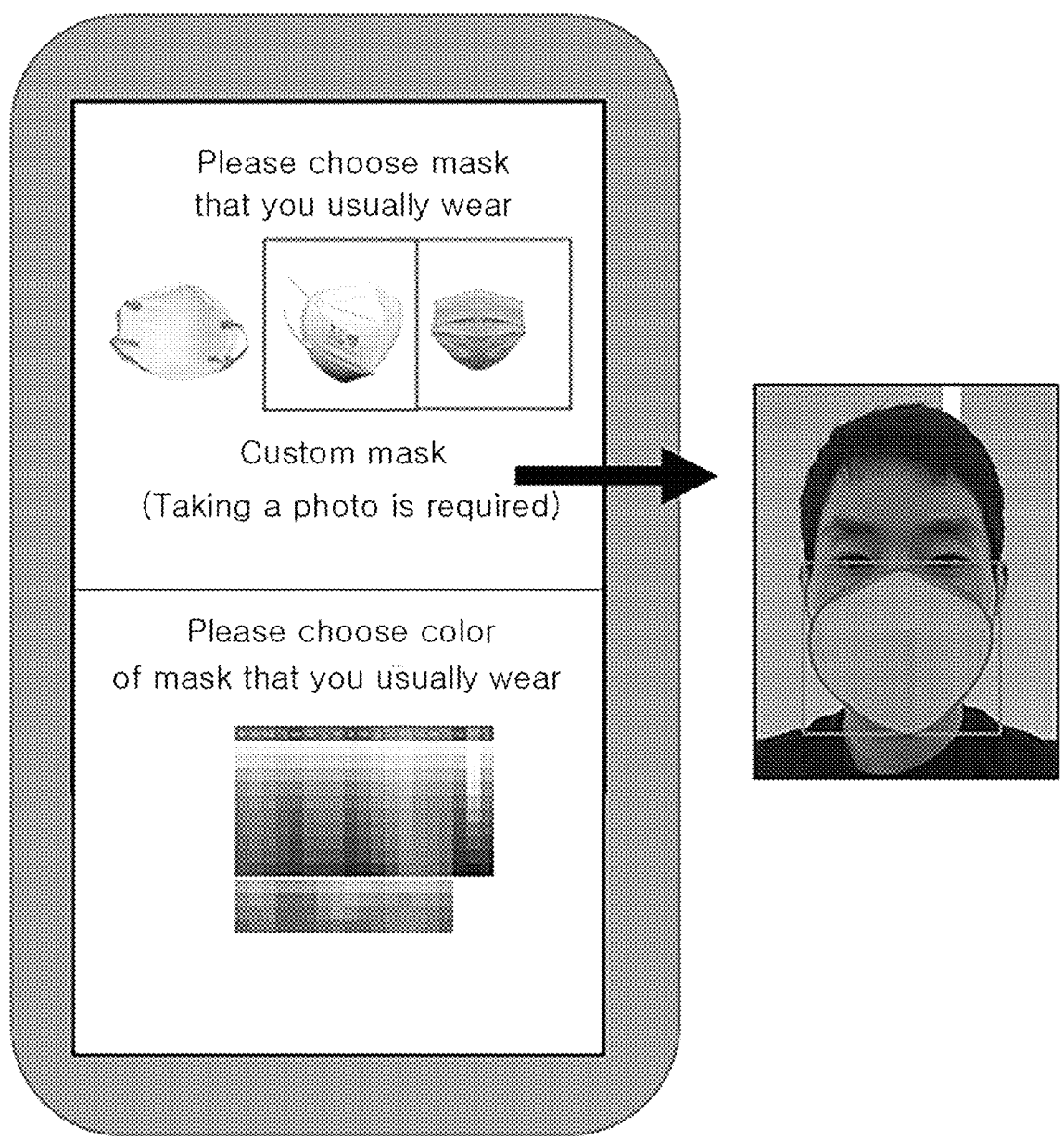
FIG. 7 is a schematic diagram of a user interface display for generating a mask shape template according to an embodiment of the present disclosure.

FIG. 7 is a schematic diagram of a user interface display for generating the mask shape template according to an embodiment of the present disclosure.

Referring to FIG. 7 the user authentication device 100 provides the user interface display and receives the user input for generating the mask shape template. The user input may include input of a commercially available mask type (for example, a KF 80 mask, a KF 94 mask, a surgical mask), a color, a material, and/or a texture.

In another embodiment, the user authentication device 100 may receive an image input as the user input and generate the mask shape template. When a mask that is not classified as the commercially available mask type such as a custom mask is frequently worn by the device user, a different embodiment may be used. The user authentication device 100 captures an image of the custom mask and treats the custom mask image as the user input. The user authentication device 100 may detect the mask region in the custom mask image using a bounding box and segment along the boundaries to generate the mask shape template having the extracted texture.

Through the user input, the user authentication device 100 may acquire and store the mask characteristics of mask(s) usually worn by the device user.

In an alternative embodiment, when there is a mask shape template generated by the user input at the time of attempting to authenticate the user, the user authentication device 100 may perform the user authentication only when the mask characteristics worn by the target object and the mask characteristics of the mask shape template generated by the user input match.

For example, the user authentication device 100 recognizes the mask type worn by the target object based on the mask characteristics extracted from the target object image, and performs the user authentication only when the recognized mask type worn by the target object and the mask type of the mask shape template generated by the user input match.

In an embodiment, the mask shape template generated by the user input may be a favorite mask shape template.

In an embodiment, in case that there is a mask shape template used recently for user authentication, the user authentication device 100 may perform the user authentication only when the mask characteristics worn by the target object and the mask characteristics of the latest mask shape template match.

For example, the user authentication device 100 recognizes the mask type worn by the target object based on the mask characteristics extracted from the target object image, and performs the user authentication only when the recognized mask type worn by the target object and the mask type of the latest mask shape template match.

When the mask characteristics worn by the target object and the mask characteristics of the mask shape template generated by the user input do not match, user authentication failure is unconditionally returned and additional authentication is required. For example, additional security PIN number is required to increase the security.

In case that a mask shape template having the texture extracted from the custom mask image exists as the mask shape template generated by the user input, the user authentication device 100 performs the user authentication only when the mask texture extracted from the target object image and the texture of the mask shape template generated by the user input match.

Additionally, the user authentication device 100 may detect the mask characteristics in the target object image, and recognize the mask type, shape and/or color using the detected mask characteristics. The mask characteristics are features extracted from the mask region acquired as a result of the recognition in the step S430.

Figure 8:
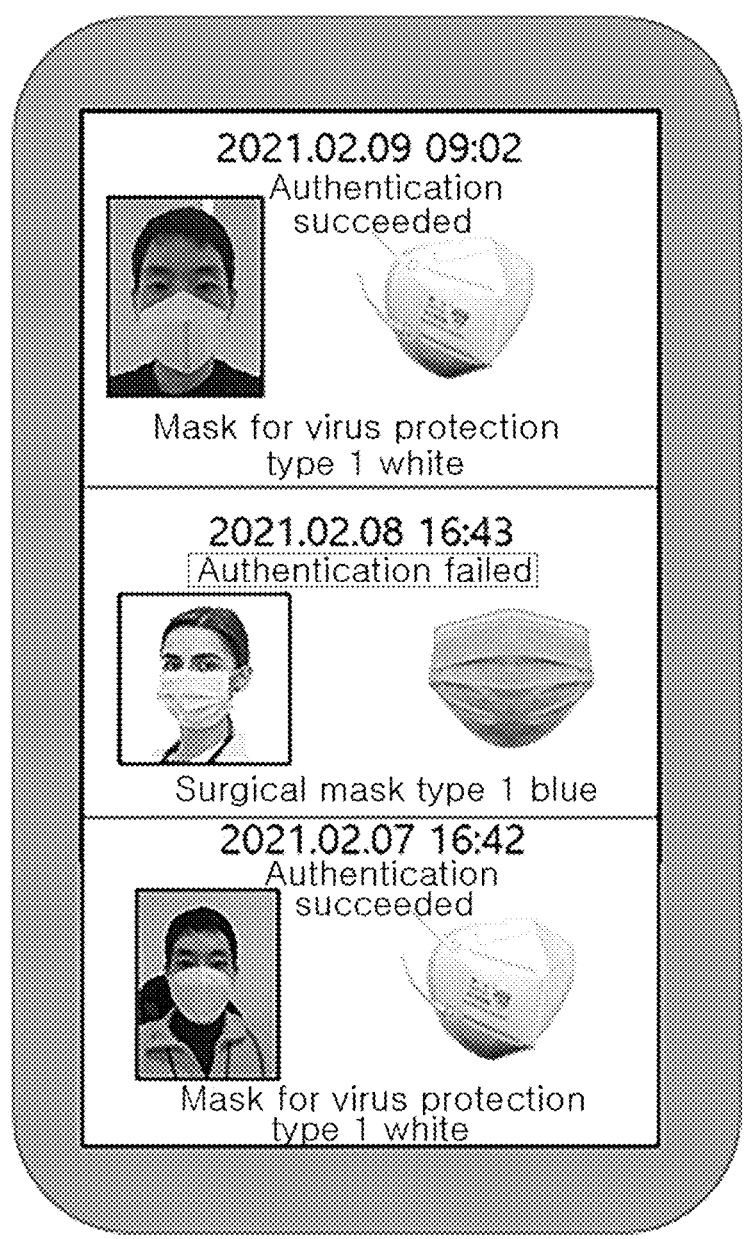
FIG. 8 shows mask recognition records according to an embodiment of the present disclosure.

FIG. 8 shows mask recognition records according to an embodiment of the present disclosure.

Referring to FIG. 8, when the user authentication is completed, the user authentication device 100 records the recognition result (for example, success or failure) and mask information (for example, the mask type, shape and/or color) recognized in the user authentication process. Additionally, the user authentication device 100 may provide the user with user authentication records including mask recognition records.

Additionally, the user authentication device 100 may set a variety of functions related to the user authentication operation when the masked image is inputted as the target object image. The settings of the functions may be implemented by activation/deactivation of preset functions.

Figure 9:
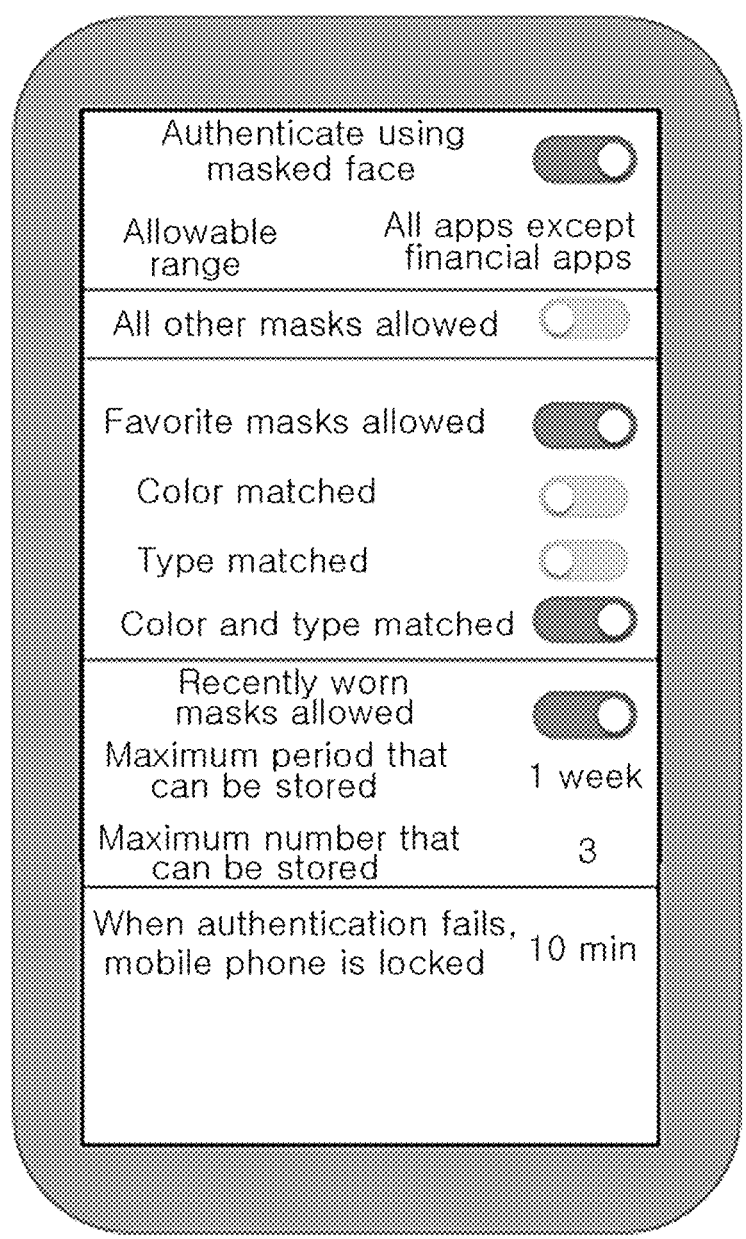
FIG. 9 shows a user interface display for setting a function related to a user authentication operation according to an embodiment of the present disclosure.

FIG. 9 shows a user interface display for setting the function related to the user authentication operation according to an embodiment of the present disclosure.

In an embodiment, the user authentication device 100 may differently set the authority to use the device when the user authentication succeeds after unmasked is recognized in the step S430 and the user authentication succeeds after masked is recognized in the step S430.

The range of authority to use the device for the user having successfully authenticated is different depending on whether the user authentication was performed based on the reference data or the secondary reference data. For example, the range of authority to use the device may be set to authorize the user to access some (for example, a financial application of FIG. 9) of a plurality of applications installed in the device only when the user authentication was performed based on the main reference data.

In an embodiment, the range of authority to use the device may be additionally changed by the user input.

Additionally, the user authentication device 100 may be configured to set characteristics items used in the user authentication of the target object wearing a mask. For example, the user authentication device 100 may be set not to use all other masks than the preset mask types such as custom masks.

Alternatively, the user authentication device 100 may set the range of the mask characteristics for the favorite mask shape template. For example, the user authentication device 100 may set the range of the mask characteristics (for example, a color, a type and a combination thereof) used to determine the match of the mask characteristics before user authentication.

The user authentication device 100 sets all or some of the mask characteristics of the favorite mask, and determines a mismatch with the mask characteristics recognized in the target object image using the mask characteristics in the set range. When the color characteristics and the type characteristics are activated as shown in FIG. 9, the calculation of the authentication similarity between the target object and the device user may be performed only when the mask color characteristics and the mask type characteristics recognized in the target object image and the pre-stored mask characteristics and mask type characteristics of the secondary reference data match.

In an embodiment, only when the mask characteristics worn by the target object and the mask characteristics the latest mask shape template match, the user authentication device 100 may activate or inactivate at least some of the functions for the user authentication. For example, the user authentication device 100 may set the period and number of latest mask shape templates to be used for the match of the mask characteristics. In the case of the settings as shown in FIG. 9, when the period of use of the mask shape template used last time is 8 days past, the latest mask shape template is initialized.

In an embodiment, the user authentication device 100 may provide the user with the virtual mask model or the fake masked image before the user authentication. Then, the device user may adjust the mask in the fake masked image or the virtual mask model through the user input to match the mask that the user currently wears. For example, the user authentication device 100 may adjust the mask size, the mask texture, the mask brightness, the mask illumination level, the light direction of the mask and/or the mask resolution according to the user input.

FIGS. 10A to 10D are schematic diagrams of mask characteristics adjustment according to an embodiment of the present disclosure.

Figure 10A:
FIG. 10A shows adjustment of mask size among mask characteristics.
Figure 10B:
FIG. 10B shows adjustment of mask brightness among mask characteristics.
Figure 10C:
FIG. 10C shows adjustment of mask resolution among mask characteristics.

FIG. 10A shows the adjustment of the mask size among the mask characteristics, FIG. 10B shows the adjustment of the mask brightness among the mask characteristics, FIG. 10C shows the adjustment of the mask resolution among the mask characteristics, and FIG. 10D shows the adjustment of the mask illumination level and/or the light direction among the mask characteristics.

The user authentication device 100 may adjust the size of the mask in the generated fake masked image or the virtual mask model. As shown in FIG. 10A, the user may reduce the size of the mask in the fake masked image.

The user authentication device 100 may adjust the brightness of the mask in the generated fake masked image or the virtual mask model.

In an embodiment, the user authentication device 100 may adjust the mask brightness according to the user input.

In another embodiment, the user authentication device 100 may recognize the light intensity in the registered face image, used to generate the main reference data, and adjust the brightness of the mask in the fake masked image or the virtual mask model to the recognized light intensity. As shown in FIG. 10B, the brightness of the mask in the initially generated fake masked image may not match the brightness of the registered face image with which it will be combined. Then, the user authentication device 100 may adjust the mask brightness to match the brightness of the registered face image.

The user authentication device 100 may adjust the resolution of the mask in the generated fake masked image or the virtual mask model.

In an embodiment, the user authentication device 100 may adjust the mask resolution according to the user input.

In another embodiment, the user authentication device 100 may recognize the resolution of an external region of the mask region included in the registered face image, and adjust the resolution of the mask in the fake masked image or the virtual mask model to the recognized resolution of the external region. Then, as shown in FIG. 10C, the user authentication device 100 may adjust the mask resolution to match the resolution of the registered face image.

Through the resolution adjustment, the user authentication device 100 may generate the fake masked image in which the texture quality of the mask in the fake masked image and the texture quality of the remaining region (for example, an exposed face region) other than the mask match.

Additionally, the user authentication device 100 may adjust the mask illumination level and/or the light direction in the generated fake masked image or the virtual mask model.

In an embodiment, the user authentication device 100 may adjust the mask illumination level and the light direction according to the user input.

In another embodiment, the user authentication device 100 may recognize the light intensity and/or the light direction in the registered face image, used to generate the main reference data, and adjust the illumination level and/or the light direction of the mask in the fake masked image or the virtual mask model to the recognized light intensity and/or light direction. The user authentication device 100 predicts the illumination level and light direction of the image by recognizing the location and/or direction of a light source based on the contour, shade and phase in the face patch according to the anatomical step structure of the face in the registered face image. The user authentication device 100 adjusts the illumination level and light direction of the mask of the initially generated fake masked image to match the predicted illumination level and light direction of the registered face image. Then, as shown in FIG. 10D, the fake masked image that matches the registered face image better is acquired, thereby improving the matching accuracy.

The user authentication device 100 according to the embodiments may have aspects of entirely hardware, entirely software, or partly hardware and partly software. For example, the device may refer collectively to hardware capable of processing data and software that manages the hardware. The term "unit", "module", "device" or "system" as used herein is intended to refer to a combination of hardware and software that runs by the corresponding hardware. For example, the hardware may be a computing device capable of processing data, including a Central Processing Unit (CPU), a Graphic Processing Unit (GPU) or other processor. Additionally, the software may refer to a process being executed, an object, an executable, a thread of execution and a program.

The user authentication device 100 may be implemented in various types of hardware which acquires an image and processes the corresponding image. For example, the user authentication device 100 may be implemented as a smartphone, a smart glass, a smart watch, a wearable device, a tablet computer and a laptop computer, but is not limited thereto.

Figure 11:
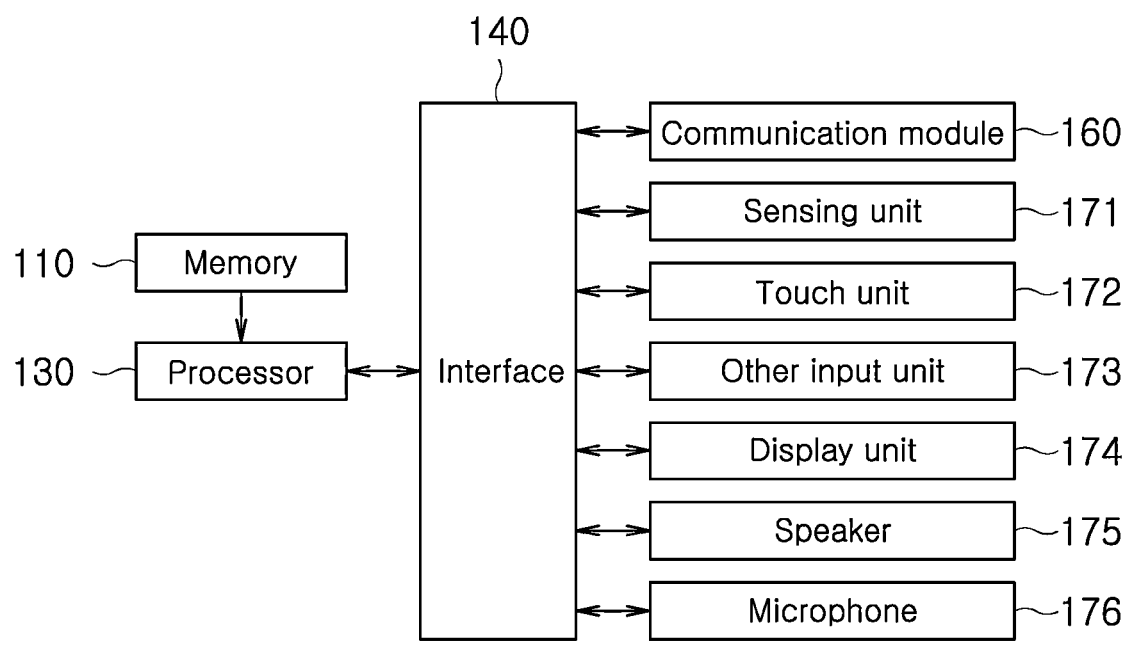
FIG. 11 is a schematic diagram of the internal configuration of a user authentication device 100 according to an embodiment of the present disclosure.

FIG. 11 is a schematic diagram of the internal configuration of the user authentication device 100 according to an embodiment of the present disclosure.

Referring to FIG. 11, the user authentication device 100 may include a memory 110, a processor 130, an interface 140, a communication module 160, and at least one interface unit to input/output information. The interface unit includes a sensing unit 171, an input unit and a display unit 174. The input unit includes a touch unit 172 and/or other input unit 173.

In certain embodiments, the interface unit may further include a speaker 175 and a microphone 176.

The memory 110 may include a nonvolatile memory. The nonvolatile memory may include, for example, solid state drive (SSD), hard disk drive (HDD) and flash memory, but is not limited thereto, and may include other nonvolatile semiconductor memory. In certain embodiments, the memory 110 may further include a storage device disposed at a remote location from the user authentication device 100, for example, a distributed storage which is accessed via a wired/wireless communication network.

The processor 130 is configured to perform data processing and/or image processing. The processor 130 may include CPU and GPU. Although FIG. 2B shows the processor 130 as a single component, the processor 130 is not limited thereto. For example, the processor 130 may be implemented as a single chip or multiple chips according to the design.

The processor 130 is configured to perform the above-described operation of FIGS. 2 to 10.

The interface 140 connects devices related to input/output of the user authentication device 100 with the memory 110 and/or the processor 130. The interface 140 may be implemented as a combination of software and/or hardware depending on the connected devices related to input/output. For example, the interface 140 may include an interface for communication, an interface for touch and other input unit and an interface for audio, the audio interface may include an audio circuit (for example, a headset jack) to convert data into an electrical signal and transmit the electrical signal, and the interface for touch and other input unit may include at least one input controller to transmit an electrical signal corresponding to a user input acquired through at least one input unit to the processor 130.

The communication module 160 is configured to transmit/receive electromagnetic waves. The user authentication device 100 communicates with a control server 200 through the communication module 160.

The communication module 160 converts the electrical signal into the electromagnetic waves or converts the electromagnetic waves into the electrical signal. A user terminal 100 allows the user to make a call or use an application that offers a service on an Internet through the communication module 160. The communication module 160 may communicate with another device by a variety of communication methods for networking between objects, including wired communication, wireless communication, 3G, 4G, wired Internet or wireless Internet. For example, the communication module 160 is configured to perform communication via a network such as Internet such as World Wide Web (WWW) and Intranet and/or a cellular telephone network, a wireless network and wireless communication. The wireless communication includes, for example, Global System for Mobile Network (GSM), Code Division Multiple Access (COMA), Wideband Code Division Multiple Access (W-CDMA), Time Division Multiple Access (TDMA), Bluetooth, W-Fi, World Interoperability for Microwave Access (W-MAX) and/or wireless communication standards using the communication protocol for e-mail, instant messaging and short message server (SMS), but is not limited thereto.

The sensing unit 171 is a component for generating sensing data for generating an image of the target object in response to the waves, and may be a visible light sensor module that generates image data of the target object in response to visible light.

The touch unit 172 and the other input unit 173 are components configured to receive the commands related to the user input. Some of the user's body parts or another object is used as a pointing object when sending the input to the touch unit 172. The touch unit 172 may include a resistive or electrostatic sensor, but is not limited thereto. The other input unit 173 includes, for example, a button, a dial, a switch and a stick.

The display unit 174 is a component for displaying the stored and/or processed information of the user authentication device 100, and may include, for example, a liquid crystal display (LCD), an organic light emitting diode (OLED) and a flexible screen, but is not limited thereto.

Although FIG. 11 shows the touch unit 172 and the display unit 174 separated from each other, in many embodiments, the touch unit 172 and the display unit 174 may be implemented as one component to receive input and output information. For example, as shown in FIG. 7 and other drawings, when the user authentication device 100 is configured to receive the user input through the user interface display, the touch unit 172 and the display unit 174 may be a touch panel implemented as a touch screen having a layer structure with a screen. The touch input is inputted by the pointing object (for example, including the user's body part or a tool).

The speaker 175 converts the electrical signal into sound waves having audible frequencies. The data processed by the processor 130 or data pre-stored in the memory 110 is converted into the electrical signal through the interface 140 and inputted to the speaker 175, and finally, the sound waves are outputted. The microphone 176 converts the sound waves into the electrical signal. When the user terminal 100 is configured to determine convergence or divergence through an audio response of the target object, the speaker 175 may be used to output the sound waves for inducing the audio input of the target object, and the microphone 176 may be used to receive the input of the audio response of the target object.

The user authentication device 100 according to the above-described embodiments and the operation of the user authentication method performed thereby may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage and networking component (either wireless or wired). For example, the computer may run Microsoft Windows-compatible operating systems (OSs) and OSs such as Apple OS X or iOS, Linux distribution, or Google's Android OS.

The computer-readable recording medium includes any type of recording device to store and retrieve computer-readable data. Examples of the computer-readable recording medium include read only memory (ROM), random access memory (RAM), compact disc read only memory (CD-ROM), magnetic tape, floppy disk, and optical storage to store and retrieve data. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of example and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

The invention claimed is:

1. A user authentication device having a processor configured to:
    detect a face region in a target object image including at least part of a face of a target object, the target object image being a masked image or an unmasked image,
    recognize masked or unmasked in the face region,
    extract target object characteristics data from the face region of the target object image, and
    call reference data and authenticate if the target object is a registered device user based on the called reference data and the target object characteristics data,
    wherein the reference data is generated from an unmasked image of the registered device user,
    wherein the called reference data is main reference data or secondary reference data, and when masked is recognized, the main reference data is called, and when unmasked is recognized, the secondary reference data is called,
    wherein the secondary reference data is generated using a virtual mask template created based on a user input including mask characteristics,
    wherein the main reference data and the secondary reference data are generated from the unmasked image of the registered device user, and
    wherein, to generate the secondary reference data, the processor is further configured to:
    generate a 3-dimensional (3D) face model of the device user from the face region of the unmasked image of the registered device user and acquire a surface shape of the device user,
    generate a virtual mask model, based on the virtual mask template, having a surface shape that matches the surface shape of the device user,
    generate a fake masked image of the device user based on the generated virtual mask model and the 3D face model of the device user, and
    extract characteristics data from the fake masked image of the device user to generate the secondary reference data.

2. The user authentication device according to claim 1, wherein, to generate the main reference data, the processor is further configured to:
    detect the face region in the unmasked image of the registered device user, and
    extract characteristics data from the face region of the unmasked image of the device user to generate the main reference data.

3. The user authentication device according to claim 1, wherein the user authentication device includes at least one of a feature extractor to extract 2-dimensional (2D) characteristics from an input image or a depth extractor to extract 3D characteristics, and extracts the characteristics data of the reference data and the target object characteristics data using the at least one included extractor.

4. The user authentication device according to claim 3, wherein the at least one included extractor is a trained neural network to extract the characteristics data from the input image using a training dataset including masked images alone, a training dataset including unmasked images alone, or a training dataset including masked images and unmasked images.

5. The user authentication device according to claim 1, wherein the mask shape template is generated based on pre-stored mask characteristics, and
    the processor is configured to call the mask shape template based on the mask characteristics that matches mask characteristics included in the target object characteristics data extracted from the target object image, when the masked image is inputted as the target object image.

6. The user authentication device according to claim 1, wherein, to generate the fake masked image, the processor renders the virtual mask model to 2D and projects onto the unmasked image of the device user.

7. The user authentication device according to claim 6, wherein the processor generates the fake masked image after masked in the target object image is recognized, and
    a location of projection in the unmasked image of the device user is a location that matches a mask region in the target object image.

8. The user authentication device according to claim 1, wherein in case that there is the mask shape template generated by the user input at a time of user authentication, the processor is configured to perform the user authentication only when mask characteristics worn by the target object and the mask characteristics of the mask shape template generated by the user input match.

9. The user authentication device according to claim 1, wherein the processor is configured to:
    record a user recognition result including a previous recognition result and recognized mask characteristics, and
    in case that there is a latest mask shape template recorded at a time of user authentication, perform the user authentication only when mask characteristics worn by the target object and mask characteristics of the latest mask shape template match.

10. The user authentication device according to claim 1, wherein the processor is configured to:

give an authority to use the device to the device user having succeeded the user authentication, and differently set a range of the authority given when the user authentication succeeded after unmasked in the target object image is recognized and a range of the authority given when the user authentication succeeded after masked in the target object image is recognized.

11. The user authentication device according to claim 1, wherein the processor is further configured to adjust a mask of the fake masked image to match the mask characteristics of the extracted characteristics data when the unmasked image of the target object is inputted as the target object image.

12. The user authentication device according to claim 11, wherein the processor adjusts at least one of a size of the mask, a texture of the mask, a brightness of the mask, an illumination level of the mask, a light direction of the mask or a resolution of the mask to match the mask characteristics of the extracted characteristics data.

13. A user authentication method comprising:

detecting a face region in a target object image including at least part of a face of a target object, the target object image being a masked image or an unmasked image, recognizing masked or unmasked in the face region, extracting target object characteristics data from the face region of the target object image, and calling reference data and authenticate if the target object is a registered device user based on the called reference data and the target object characteristics data, wherein the reference data is generated from an unmasked image of the registered device user, wherein the called reference data is main reference data or secondary reference data, and when masked is recognized, the main reference data is called, and when unmasked is recognized, the secondary reference data is called, wherein the secondary reference data is generated using a virtual mask template created based on a user input including mask characteristics including at least one of a mask type, a mask texture, a mask color or a mask shape, wherein the secondary reference data is generate by:

generating a 3-dimensional (3D) face model of the device user from the face region of the unmasked image of the registered device user and acquire a surface shape of the device user, generating a virtual mask model, based on the virtual mask template, having a surface shape that matches the surface shape of the device user, generating a fake masked image of the device user based on the generated virtual mask model and the 3D face model of the device user, and extracting characteristics data from the fake masked image of the device user to generate the secondary reference data.

14. A user authentication method comprising:

detecting a face region in a target object image including at least part of a face of a target object, the target object image being a masked image or an unmasked image, recognizing masked or unmasked in the face region, extracting target object characteristics data from the face region of the target object image, calling reference data and authenticate if the target object is a registered device user based on the called reference data and the target object characteristics data, record a user recognition result including a previous recognition result and recognized mask characteristics, based on a determination that there is a latest mask shape template recorded at a time of user authentication, perform the user authentication only when mask characteristics worn by the target object and mask characteristics of the latest mask shape template match, wherein the reference data is generated from an unmasked image of the registered device user, wherein the reference data is generated by:

generating a 3-dimensional (3D) face model of the device user from the face region of the unmasked image of the registered device user and acquire a surface shape of the device user, generating a virtual mask model, based on a virtual mask template, having a surface shape that matches the surface shape of the device user, generating a fake masked image of the device user based on the generated virtual mask model and the 3D face model of the device user, and extracting characteristics data from the fake masked image of the device user to generate the reference data.

* * * * *